June 13, 1961  R. N. FLECK ET AL  2,988,578
PROCESS FOR SHIFTING THE DOUBLE BOND OF A NORMAL OLEFIN
Filed Sept. 28, 1956
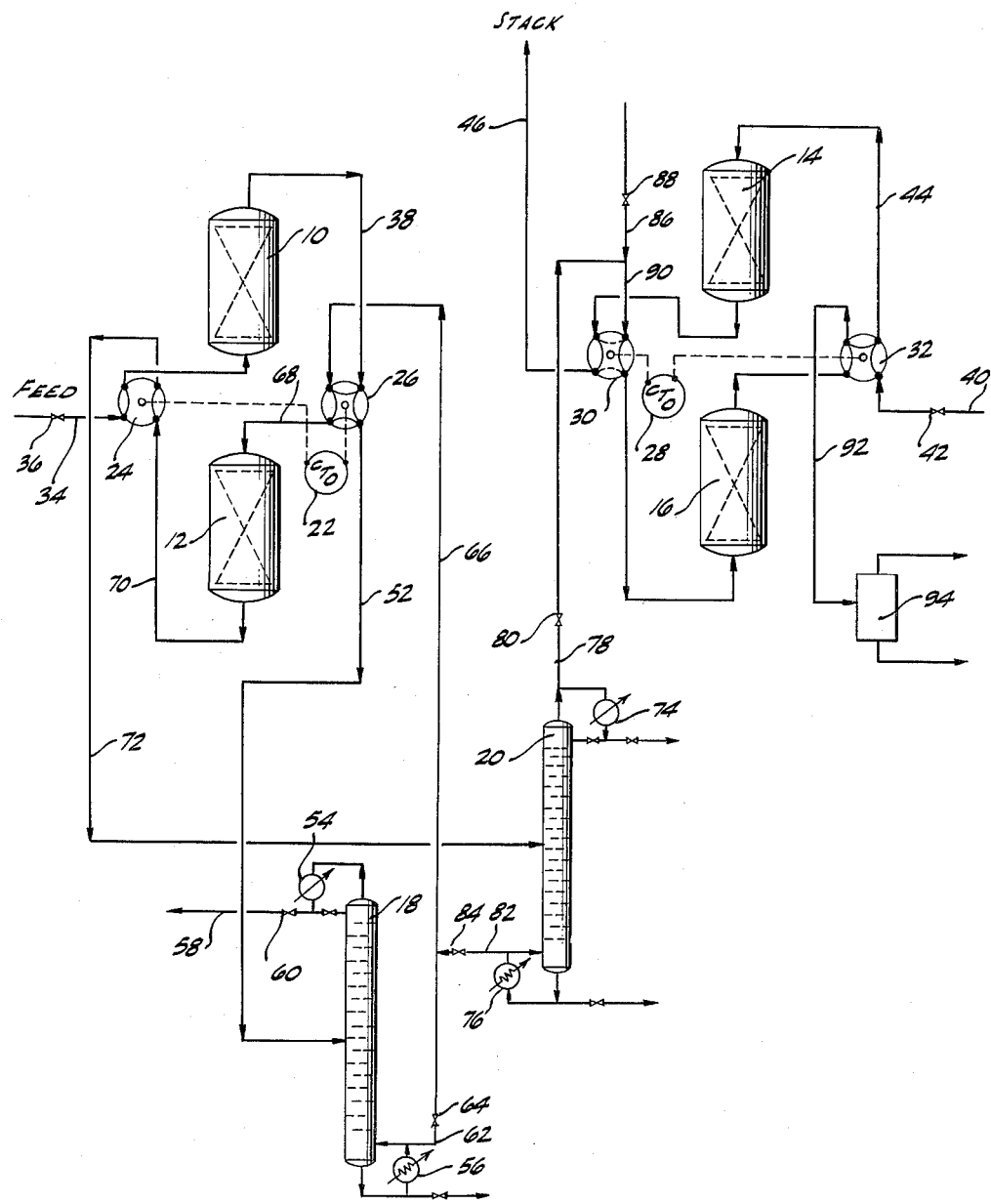
INVENTORS.
RAYMOND N. FLECK,
CARLYLE G. WIGHT,
BY
ATTORNEY.

United States Patent Office 2,988,578
Patented June 13, 1961

2,988,578
PROCESS FOR SHIFTING THE DOUBLE BOND OF A NORMAL OLEFIN
Raymond N. Fleck, Whittier, and Carlyle G. Wight, Fullerton, Calif., assignors to Union Oil Company of California, Los Angeles, Calif., a corporation of California
Filed Sept. 28, 1956, Ser. No. 612,847
3 Claims. (Cl. 260—683.2)

This invention relates to the isomerization of hydrocarbons and particularly to the isomerization of olefins to produce isomers in which the unsaturated linkage has migrated to a new location between other than the two adjoining carbon atoms where it existed in the feed material. The present invention is also applicable to the separation of certain isomeric olefin mixtures.

The isomerization of olefins is a well-known phenomenon. The double bond present in olefin hydrocarbons is rather labile and accordingly it shifts rather readily. Practically, however, olefin isomerization requires rather high temperatures to produce any effective quantity of the isomers. For example, thermal isomerization of normal butene is effected at about 1202° F. (650° C.) to produce about 37% of cis and trans butenes. Rather extensive isomerization of pentene-1 and pentene-2 is similarly effected at temperatures of the order of 1074° F. (580° C.). However, little or no branching of the carbon chain occurs. Hexene-1 is partially isomerized to hexene-2 and hexene-3 over a molybdic sulfide catalyst at temperatures of the order of 662° F. to 752° F. (350–400° C.). Isomerization and some branching takes place when hexene-1 and heptene-1 are isomerized in the presence of a thoria or alumina catalyst at temperatures of the order of 752° F. (400° C.). Silica alumina cracking catalysts have been found effective in isomerizing normal butene, normal pentene, and normal octene at temperatures of the order of from 706° F. to 1112° F. (375–600° C.). These latter reactions are extremely important because they are actively involved in the catalytic cracking of gas oils to produce high anti-knock rating gasoline products.

In all of these previously known olefin isomerization processes, the reaction temperatures are rather high, being above about 700° F., and substantial quantities of the hydrocarbons are simultaneously thermally decomposed to produce coke and gas which undesirably affects the isomerization yield. The present invention is directed to an improved process for isomerizing olefins at temperatures far below those employed in the above-described processes, and at which no cracking or thermal decomposition or chain branching occurs, in the presence of an effective contact material which converts normal 1-olefins into substantial yields of various cis and trans isomers having high anti-knock ratings.

It is accordingly a primary object of this invention to provide an improved isomerization process for treating unsaturated hydrocarbons.

It is a more specific object of this invention to provide a process for the isomerization of olefin hydrocarbons in the presence of a partially dehydrated zeolitic metallo alumino silicate contact material.

It is also an object of this invention to provide a process for the adsorptive fractionation of an olefin containing feed to produce a concentrated olefin hydrocarbon stream and the isomerization of the normal olefin hydrocarbons in the concentrate to produce an effluent containing cis and trans isomers of the olefins.

It is a more specific object of this invention to isomerize olefin hydrocarbons boiling in the gasoline boiling range ($C_4$ to 400° F.) to produce olefin isomers having substantially increased knock ratings and which can be used as blending stock for premium and aviation grade gasoline.

Other objects and advantages of the present invention will become more apparent to those skilled in the art as the description and illustration thereof proceed.

Briefly, the present invention comprises a process for treating olefin hydrocarbons to produce isomeric olefin hydrocarbons by contacting the olefin-containing feed stock with a particular adsorptive solid contact material hereinafter more fully described. The olefin may be passed in the vapor phase or in the liquid phase in contact with the contact material, but the vapor phase is preferred because the hydrocarbon holdup on the contact material is negligible. The solid contact material may be employed in the form of a static bed of granular solids, a moving bed of granular solids, or a fluidized suspension of the solids using finer granules or powders.

The isomerization conditions may be varied considerably depending upon whether the hydrocarbon is to be contacted in the liquid or vapor phase. In distinction to the excessively high isomerization temperatures characteristic of the prior art, in the present process isomerization temperatures may be varied between about atmospheric temperature and about 450° F., preferred temperatures being between about 100° F. and 350° F. The isomerization pressure does not appear to be critical and accordingly may be varied between subatmospheric and superatmospheric values. The selection of temperatures and pressures is of course related closely to the liquid and vapor phase condition of the material being treated.

The process of this invention employs an adsorptive solid contact material which promotes the migration of the olefin double bond, and which also has a preferential adsorption capacity for normal olefins over that for normal paraffins of an equal number of carbon atoms. The adsorption preference is such, relative to the normal paraffins, that normal hexene-1 and normal nonane are about equally adsorbable, even at the preferred isomerization temperatures indicated above. Thus, in one modification of this process the contact material is used simultaneously to adsorb and separate the normal olefins from a mixture of hydrocarbons and to isomerize the adsorbed olefins to produce normal cis and trans 2-olefins and higher olefin isomers. In this process the contact material contacts the olefin feed mixture in an adsorption isomerization step, the unadsorbed materials are removed, and the rich adsorbent is treated in a displacement exchange step to recover the olefin isomers. The process steps are repeated in sequence. Any branched chain olefin isomers of high anti-knock rating pass through the adsorption step unadsorbed.

In another modification, the olefin-containing feed is passed through contact with the contact material in a steady stream, the olefin isomers are produced during the contact and are contained with non-isomerized materials in the effluent, and the contact material is periodically regenerated to remove deposits which accumulate only very slowly due to the low temperature of the process. The effluent from the isomerization step, comprising a mixture of olefin hydrocarbon isomers, may be either used as such for further reaction or for fuel blending, or it may be subjected to further fractionation to separate olefin isomers from other materials.

In the present invention the isomerization feed stream is preferably pre-fractionated, such as by distillation, or by contacting it with a solid granular contact material or other means. In this way the olefins can be concentrated in a narrow cut and the concentrate is isomerized. With some adsorbents, such as silica gel, and the preferred adsorbent defined below, a concentrate of normal 1-olefin can be produced at relatively low temperatures and little isomerization occurs at this time. The anti-knock rating of 1-olefin is relatively high, that of hexene-1 being 77, This rating increases as the double bond migrates toward the center of the molecule, hexene-2 having a rating of 89 and hexene-3 having a rating of 97 (all ratings F–1 clear). The isomeric olefin fractions are therefore obviously valuable materials for fuel blending and also excellent starting materials for chemical synthesis because of their high reactivity.

In the present invention the granular solid contact material employed as the isomerization catalyst and as the granular adsorbent for fractionation of the various olefin isomers in the effluent comprises either the natural or synthetic crystalline partially dehydrated metallo alumino silicates having pores of substantially uniform diameter and commonly known as "molecule sieves." These materials are zeolites and can be manufactured synthetically or can be manufactured from naturally occurring raw materials. The composition of one typical synthetic zeolite having a pore size of about 4 A. is

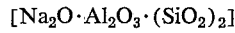

It may be prepared by heating stoichiometric quantities of alumina with silica and excess caustic under pressure, after which the unreacted caustic is removed by washing. The pore size of this material can be increased by replacing part of the sodium with another metal. Thus, the 4 A. silicate can be ion exchanged with a concentrated solution of a calcium salt at superatmospheric pressure and temperatures of 150–300° C. to produce

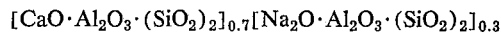

having a pore size of about 5 A. This latter 5 A. material is the preferred adsorbent used in this invention to isomerize normal olefins and to fractionate the normal olefin isomers. Certain naturally occurring minerals, such as chabazite, analcite, gmelinite, and the like, can be heated to dehydrate the molecule partially and obtain an activated zeolitic adsorbent similar in adsorption properties to the above-described manufactured materials. These natural and synthetic materials are all zeolites and their sodium and calcium derivatives are very stable adsorbents which apparently have "pores" available for adsorption which are quite uniform in size.

The synthetic crystalline partially dehydrated metallo alumino silicate zeolitic adsorbents are presently available items of commerce marketed by Linde Air Products Company, 30 East 42nd Street, New York 17, New York, under the name of "Molecular Sieves 4A, 5A, etc." Other adsorbents such as activated charcoal, activated alumina, and other well known materials are applicable herein to fractionate particular feed mixtures. However, their specific affinities for particular compounds must be considered in connection with the specific feed mixture in order to determine whether a particular component will be present in the extract phase produced from the adsorbent by the displacement exchange or will be present in the raffinate phase from the adsorber. The isomerization effect is not found with these other adsorbents, but is very pronounced with the 5 A. metallo alumino silicate.

In the adsorptive fractionation part of the process, the olefins adsorbed from the feed stock are recovered from the adsorbent and the concentrate is isomerized. With these particular adsorbents, however, having a high affinity for normal olefins, the use of stripping steam commonly used with other adsorbents is less desirable because of the partial dehydration step which activates the adsorbent in the first place. It is preferred therefore to use a displacement exchange technique involving the step of contacting the rich adsorbent with a recirculating stream of a displacement exchange medium containing normal hydrocarbons with molecules consisting of carbon chains which contain on the order of 2 to 4 more carbon atoms per molecule than the olefin being displaced. For example, in the recovery of hexene-1 from a metallo alumino silicate adsorbent, a recirculating stream containing substantial quantities of normal octane, normal nonane, or normal decane, or any or all of them, is extremely effective. Such an operation produces an extract or displacement exchange effluent stream containing unadsorbed displacement exchange material together with the displaced normal olefins of substantially lower boiling point. The extract is thus readily separable by distillation to produce the olefinic isomerization feed overhead and the displacement exchange paraffin as bottoms product for recirculation. The thus treated adsorbent is saturated with adsorbed normal paraffin constituents from the displacement exchange stream and when this adsorbent is contacted with more olefin-containing material an unadsorbed raffinate or adsorption effluent stream is produced consisting of the unadsorbed constituents of the hydrocarbon feed together with the high boiling normal paraffins displaced from the adsorbent. Again, this mixture of materials is readily separable by distillation. The relatively high boiling displacement exchange medium separated by distillation from the extract and the raffinate streams is recirculated in the process to contact the adsorbent saturated with the adsorbed normal olefins. The adsorbed normal olefins and the unadsorbable branched chain olefins and any other hydrocarbons are thus produced in the process as separate streams. The former are employed as feed to the isomerization step.

The adsorbent employed in the process of this invention is a solid granular material having a mesh size range between about 2 and 100 mesh and preferably between about 4 and about 30 mesh. It is used in the form of a dense compact bed of material through which the feed and the displacement exchange recycle streams pass, either in the vapor phase or in the liquid phase. The process may employ the adsorbent in the form of a single static bed of material in which case the process is only semi-continuous. Preferably a plurality of two or more static beds of adsorbent are employed with appropriate remotely operable valving so that the feed stream is passed through one or more of the adsorbers in a set while the stream of displacement exchange medium passes through one or more of the other adsorbers in the set. In this case the feed and product flows are continuous, in either the vapor or liquid phase, and either up or down through the adsorbent. When the granular adsorbent is sufficiently rugged physically then the moving solids bed modification may be employed in which flow of feed is maintained continuously through an adsorption zone, the flow of displacement exchange fluid is maintained continuously through desorption zone, and the granular adsorbent is recirculated successively through these two zones. With the smaller sized mesh ranges of adsorbent, such as 100 mesh or finer, the material may be fluidized in and by the fluid streams contacting it, although the compact bed modifications are preferred since a greater number of theoretical and actual contact stages are more readily obtained in smaller and simpler equipment.

The present invention will be more readily understood by reference to the accompanying drawing representing a schematic flow diagram of the process of this invention for the adsorptive fractionation of olefin hydrocarbons and the isomerization of these olefins.

The description of the drawing will be conducted in terms of a specific example of the process of this invention applied to the isomerization of a concentrate stream containing substantial quantities of hexene-1 prepared by the preliminary adsorptive fractionation of a cracked gasoline stream containing hexene.

In the drawing are shown feed adsorbers 10 and 12, isomerization reactors 14 and 16, raffinate still 18, and extract still 20 as the essential or major equipment components. The adsorbers 10 and 12 are utilized in pairs operating alternately on a time cycle by means of cycle timer operator 22 which actuates four-way control valves 24 and 26. Cycle timer operator 28 similarly actuates isomerization reactor control valves 30 and 32 on a considerably longer time cycle. Valves 30 and 32 are also four-way valves.

The cyclic operation of both the isomerization reactors and the feed adsorbers is such that the solids in each system are alternately contacted with feed material and then regenerated for the removal of materials accumulating on the solids. Because of the very low temperatures permissible in the isomerization step of this invention, the regeneration step may be effected only periodically, that is of the order of once a week, or once a month, or even less frequently. The adsorption cycle however depends upon the feed rate and the quantity of adsorbent and conveniently the adsorbers are on cycles as short as a few hours up to a day or two.

The drawing shows feed adsorber 12 being treated to displace the normal hexene concentrate while adsorber 10 is being contacted with feed stock. First reactor 14 is being regenerated while the hexene concentrate is being isomerized in reactor 16 to produce the higher antiknock rating olefin isomers. The displacement exchange medium being fed to adsorber 10 is normal nonane.

A light thermally cracked gasoline, containing $C_5$ through $C_7$ paraffins and olefins, passes through line 34 at a rate controlled by valve 36, through reactor control valve 24 and passes in the vapor phase upwardly in contact with a silica gel adsorbent contained in first adsorber 10. The pressure is about 5 p.s.i.g. and the temperature is 280° F. The adsorption effluent from adsorber 10, comprising unadsorbed paraffinic materials together with the normal nonane displacement exchange medium left on the adsorbent from the previous operational cycle passes through line 38, through control valve 26, and through line 52 into adsorption effluent or raffinate still 18. Raffinate still 18 is provided with an overhead condenser 54 and a bottoms reboiler 56. The overhead product produced therefrom comprises the unadsorbed fraction of the feed containing most of the $C_5$-$C_7$ paraffin hydrocarbons and any branched chain olefins, and flows through line 58 at a rate controlled by valve 60. This stream is sent to production or further chemical processing not shown. The bottoms product from raffinate still 18 comprises the normal nonane displaced from the adsorbent by the olefin adsorption, and this material is recirculated through line 62 at a rate controlled by valve 64 to supply part of the displacement exchange recycle stream.

The normal nonane displacement exchange recycle stream flows through manifold 66 through adsorber control valve 26 and line 68 into second adsorber 12 where it contacts rich adsorbent saturated with adsorbed $C_5$-$C_7$ olefins while flowing in the reverse direction to that of the light gasoline feed. A more efficient displacement exchange results with such reverse flow. An active displacement exchange takes place in which the normal nonane is partly adsorbed, thereby displacing the adsorbed olefins and producing an extract or displacement exchange effluent comprising these olefins and the unadsorbed normal nonane. The extract flows through line 70, through control valve 24, and through line 72 into extract still 20. This still is provided with an overhead condenser 74 and a bottoms reboiler 76. The overhead product comprises a mixture of $C_5$-$C_7$ olefins separated from the feed stream and is the isomerization feed stock. The bottoms product is the normal nonane displacement exchange material separated from the extract. This material is removed from reboiler 76 as a vapor through line 82 at a rate controlled by valve 84 and is introduced through manifold 66 in combination with that produced from reboiler 56 for recirculation in the process.

The olefin concentrate from the feed stream flows from the top of extract column 20 through line 78 controlled by valve 80 and comprises predominantly 1-alkenes. If desired, additional 1-alkenes from other sources may be introduced through line 86 controlled by valve 88. The olefin feed passes through line 90, control valve 30, and on through reactor 16 wherein it contacts a metallo alumino silicate adsorbent having 5 A. pores. Reactor 16 is maintained at a temperature of about 280° F. and the 1-alkenes are isomerized in the vapor phase to cis and trans 2-alkenes and trans 3-alkenes. The isomerization effluent flows through control valve 32 and line 92 to an optional post-fractionation step indicated generally at 94, wherein the olefin isomers may be separated if desired, for example into $C_5$, $C_6$, and $C_7$ fractions. The product in any event contains as much as 90% of 2- and 3-alkenes of substantially increased knock rating over the 1-alkenes fed.

Simultaneously with the isomerization reaction being carried out in reactor 16, a regeneration gas comprising essentially inert materials such as nitrogen, carbon dioxide, and the like, and containing between about 0.1% and 10.0% oxygen, is introduced through line 40 at a rate controlled by valve 42, passes through control valve 32 and through line 44 into reactor 14 during the regeneration cycle in a flow direction opposite to that used during the preceding isomerization step. In so doing, the minor amount of relatively heavy hydrocarbonaceous materials accumulated from the feed and present on the contact solids is burned therefrom to produce flue gas and leaving a regenerated adsorptive contact material. The off-gas from the regeneration flows through control valve 30 and is vented to the atmosphere through line 46. A portion of this vented gas may be recirculated in the regeneration with fresh air or other sources of oxygen if desired.

The present invention is applicable in the same manner to the simultaneous fractionation and isomerization of hydrocarbon materials which comprise normal olefins in addition to other olefins as well as paraffins and other hydrocarbons. As an example of such type of operation, valve 80 is closed and adsorbers 10 and 12 are provided with the 5 A. metallo alumino silicate adsorbent. The feed stream is the same as in the above example. The displacement exchange step is again used, but here it displaces the isomerized olefins. The normal olefins with this particular adsorbent are much more readily adsorbable than the normal paraffins having the same number of carbon atoms. The normal olefins, primarily 1-alkenes are preferentially adsorbed, displacing a normal nonane displacement exchange stream in admixture with the less readily adsorbable paraffins. The 1-alkenes are isomerized on the adsorbent and the isomers are displaced by the normal nonane recycle to produce an extract fractionated in extract still 20. The isomerized product is the still 20 overhead and has a substantially increased knock rating. For example, the mixture containing alkene isomers produced overhead from still 20 via line 78 has an anti-knock rating (F–1 clear) of 90.4 whereas the cracked feed has a knock rating of 63. Therefore treatment of gasoline boiling range hydrocarbons which have been cracked or otherwise contain normal olefins are very advantageously treated according to the process of this invention to produce a blended and mixed stream of hydrocarbons containing the unfractionated olefin isomers.

The process of this invention is also applicable using the metallo alumino silicate adsorbent in an isomerization process for the treatment of olefin hydrocarbons produced in any manner whatsoever. For example, hexene-1 with an F–1 clear anti-knock rating of only 77 may be passed at about 280° F. via line 86, with valve 80 again closed, in the vapor phase in contact with 5 A. metallo alumino silicate adsorbent through reactor 16. The mixed isomerized $C_6$ olefins include 77% trans 2- and 3-hexene, 20% cis 2-hexene, and 3% unreacted hexene-1. The product is produced through line 92 and has an F–1 clear anti-knock rating of 91.5. It is an excellent blending stock.

The several adsorption or isomerization steps in the process of this invention may be operated under pressure or under vacuum, and the actual operating pressures are actually determined by the pressure at which the feed stream is available and its boiling range, and whether the material being contacted is desirably in the vapor phase or the liquid phase. The proper operating pressure can be determined by those skilled in the art from known physical characteristics of the materials to be separated; namely, the bubble point and dew point of complex hydrocarbon mixtures and the known way in which these change with pressure. The operating temperatures employed in either the adsorption or isomerization steps of the process of this invention are also determined by the physical characteristics of the feed stream and the operating pressure and also whether a vapor phase or a liquid phase contact is desired. In the complex gasoline streams the operating temperature is largely determined by the dew point and the bubble point of the stream at a given operating pressure. For example, contacting temperatures above the dew point will obviously be entirely in the vapor phase while operating temperatures below the bubble point will be entirely in the liquid phase. It is within the contemplation of the present invention to contact the feed stream at a temperature between its bubble point and its dew point so that a mixed phase isomerization, adsorption, or displacement exchange contacts will be maintained for some special streams and obviously the feed contact may be in the vapor phase followed by recycle stream contact in the liquid phase, or vice versa, if desired.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process which comprises contacting a feed stream comprising a normal 1-olefine containing at least 4 carbon atoms and being essentially free from hydrocarbons other than said normal 1-olefine with a solid partially dehydrated metallo alumino silicate having substantially uniform pores about 5 A. in diameter, said contacting being effected at a temperature between atmospheric and about 450° F. and recovering from said zeolitic silicate a product comprising a normal olefine which is isomeric with said normal 1-olefine and which differs from said normal 1-olefine in that the ethylenic bond occurs at a carbon atom other than a terminal carbon atom.

2. A process as defined by claim 1 wherein said normal 1-olefine is hexene-1, and said recovered product comprises hexene-2 and hexene-3.

3. The process which comprises contacting a feed stream consisting of a normal 1-olefine containing at least 4 carbon atoms with a solid partially dehydrated metallo alumino silicate having substantially uniform pores about 5 A. in diameter, said contacting being effected at a temperature between atmospheric and about 450° F., and recovering from said zeolitic silicate a product comprising a normal olefine which is isomeric with said normal 1-olefine and which differs from said normal 1-olefine in that the ethylenic bond occurs at a carbon atom other than a terminal carbon atom.

References Cited in the file of this patent

UNITED STATES PATENTS

| | | |
|---|---|---|
| 2,217,252 | Hoog | Oct. 8, 1940 |
| 2,313,053 | De Simo et al. | Mar. 9, 1943 |
| 2,404,340 | Zimmerman | July 16, 1946 |
| 2,428,516 | Drennan | Oct. 7, 1947 |
| 2,509,486 | Danforth | May 30, 1950 |
| 2,554,908 | Hirschler | May 29, 1951 |
| 2,620,365 | Anderson | Dec. 2, 1952 |
| 2,818,449 | Christensen et al. | Dec. 31, 1957 |
| 2,818,455 | Ballard et al. | Dec. 31, 1957 |
| 2,850,549 | Ray | Sept. 2, 1958 |
| 2,866,835 | Kimberlin et al. | Dec. 30, 1958 |
| 2,889,893 | Hess et al. | June 9, 1959 |